United States Patent

Miya

[11] 4,157,097
[45] Jun. 5, 1979

[54] SPECTACLE WASHER
[75] Inventor: Masami Miya, Tokyo, Japan
[73] Assignee: Seizo Takahashi, Tokyo, Japan
[21] Appl. No.: 915,356
[22] Filed: Jun. 14, 1978
[30] Foreign Application Priority Data
  Jun. 16, 1977 [JP] Japan .............................. 52-77843[U]
[51] Int. Cl.² .............................................. B08B 3/04
[52] U.S. Cl. .................................... 134/117; 366/128
[58] Field of Search ................. 366/128; 134/117-121, 134/136, 184, 188

[56] References Cited
U.S. PATENT DOCUMENTS

| 3,259,139 | 7/1966 | Bell et al. | 134/136 X |
| 3,353,796 | 11/1967 | Roberts | 134/117 X |
| 3,614,959 | 10/1971 | Schollmaier et al. | 134/117 |

FOREIGN PATENT DOCUMENTS
  1913374  10/1969  Fed. Rep. of Germany ........... 366/128

Primary Examiner—Robert L. Bleutge
Attorney, Agent, or Firm—Mawhinney & Mawhinney & Connors

[57] ABSTRACT

A spectacle washer including a washing tub of a generally rectangular shape and a vibrator of not ultrasonic but mechanical type. The washing tub is formed at one of its longer side walls with a nose-shaped bulge which bulges thereinto and extends along the vertical center line of that particular side wall. The bottom wall of the washing tub is partially raised to form a raised bottom which extends around that center line and merging into the nose-shaped bulge. This raised bottom is shaped and sized to allow both the lower portions of the paired rims and the paired nose pads of a pair of spectacles to stably rest thereon, while one of the sides of the spectacles being placed on that portion of the bottom wall, which is left unraised. The mechanical vibrator is equipped with an electric motor and an eccentric weight. The electric motor has its vertical shaft of rotation positioned in the vertical center plane, in which the aforementioned center line extends. The eccentric weight has its eccentric shaft of rotation connected to the vertical shaft of the electric motor so as to horizontally vibrate the spectacle washer as a whole and accordingly the spectacles relative to the washing liquid reserved in the washing tub when it is turned by the electric motor. As a result, the spectacles can be washed with the washing liquid by the actions of the shearing forces which are established inbetween.

5 Claims, 4 Drawing Figures

4,157,097

SPECTACLE WASHER

BACKGROUND OF THE INVENTION

1. Field of the Invention

The present invention relates to a cleaner for spectacles, and more particularly to a spectacle washer for washing soiled spectacles in water containing a detergent.

2. Description of the Prior Art

If a person has his spectacles soiled with such dirty fingerprints as can hardly be cleaned by means of a spectacle wiper or a cleaning cloth, he often brings his spectacles to an optician to have them washed in an ultrasonic washing machine. This tendency is recently increased with popularization of a coating or multi-layered coatings on the lenses for spectacles. Because the spectacle lenses thus coated cannot offer clearer views than those of the conventional lenses having no coating with the resultant increase in the frequency of the washing treatments needed. This need requires for development of an ultrasonic washing machine for home use, but its relatively high cost due to structural complexness disturbs popularization.

In another point of view, the cleaning method using such ultrasonic washing machine is known to have a disadvantage that its vibrating effects are so high as to be exercised deeply into an organic substance. As a result, if the frame of spectacles is made of a tortoise shell or a synthetic resin, it often turns white.

SUMMARY OF THE INVENTION

It is, therefore, an object of the present invention to provide a structure for a spectacle washer which is free from any of the drawbacks concomitant with the prior art.

It is another but major object of the present invention to provide a structure for a spectacle washer of the above type, in which spectacles to be washed can be stably received in the washing tub without contact between their lenses and any other than the washing liquid.

Still another but important object of the present invention is to provide a structure for a spectacle washer of the above type, in which a mechanical vibrator having an eccentric weight is used to simplify the construction and reduce the production cost.

According to a major feature of the present invention, there is provided a structure for a spectacle washer comprising: a washing tub of a generally rectangular shape for reserving a washing liquid therein, said washing tub having one of its longer side walls bulging thereinto to form a nose-shaped bulge extending along the vertical center line of said one of its longer side walls, said washing tub having its bottom wall partially raised to form a raised bottom extending around said vertical center line and merging into said nose-shaped bulge, said raised bottom being shaped and sized to allow at least one pair of the lower portions of the paired rims and the paired nose pads of a pair of spectacles to stably rest thereon, while one of the sides of said spectacles being placed on the remaining lower bottom wall, when said spectacle washer is loaded with said spectacles; and a mechanical vibrator including an electric motor mounted on said spectacle washer such that its vertical shaft of rotation is positioned in the vertical center plane, in which said vertical center line extends, and an eccentric weight having its eccentric shaft of rotation connected to the vertical shaft of said electric motor for horizontally vibrating said spectacle washer as a whole and accordingly said spectacles relative to said washing liquid, when it is turned by said electric motor, so that said spectacles may be washed with said washing liquid by the actions of the squeezing forces established inbetween.

BRIEF DESCRIPTION OF THE DRAWINGS

Other objects and advantages of the present invention will become apparent from the following description taken in conjunction with the accompanying drawings, in which.

DESCRIPTION OF THE PREFERRED EMBODIMENT

Figure 1:
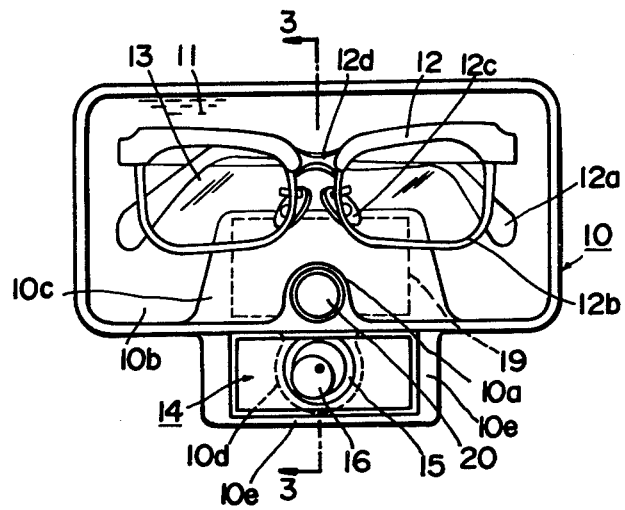
FIG. 1 is a top plan view showing a spectacle washer according to the present invention.
Figure 2:
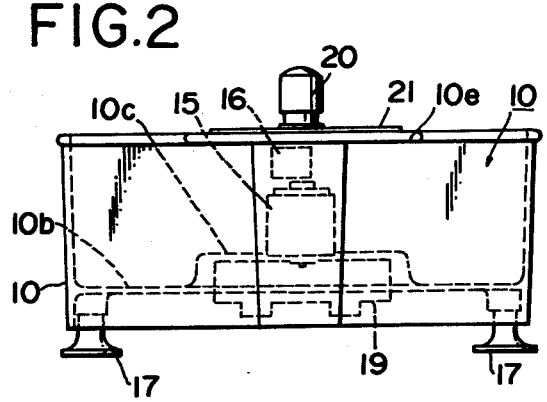
FIG. 2 is an elevational view showing the spectacle washer of FIG. 1.

With reference to FIGS. 1 to 4, a spectacle washer exemplifying the present invention will now be described.

The spectacle washer is equipped with a washing tub 10 of lidless type, which is formed generally into a rectangular shape for reserving therein a washing liquid 11, e.g., water containing a detergent. The washing tub 10 is so sized as to receive the frame 12 of a pair of spectacles, which may have the maximum size of those commercially available, together with the lenses 13 thereof. As shown, the washing tub 10 thus sized is constructed to have one of its longer side walls bulging thereinto to form a nose-shaped bulge 10a which extends along the vertical center line of that particular side wall. The bottom wall 10b of the washing tub 10 is partially raised to form a raised bottom 10c which is made to extend around that center line and to merge into the nose-shaped bulge 10a.

The spectacle washer of the present invention is further equipped with a vibrator 14 of not ultrasonic but mechanical type, which is mounted on a vibrator case 10d which in turn is attached to a brim 10e extending from the intrinsic brim of the washing tub 10. The mechanical vibrator 14 includes an electric motor 15 which is mounted in the vibrator case 10d such that its vertical shaft of rotation is positioned in the vertical center plane 3—3, in which the vertical center line of the longer side wall of the washing tub 10 extends. Further inclusive in the mechanical vibrator 14 is an eccentric weight 16 which has its eccentric shaft of rotation connected to the vertical shaft of the electric motor 15 so that the spectacle washer may be horizontally vibrated as a whole when it is turned by the electric moror 15.

Four legs 17, which may preferably be made of an elastic material such as rubber, are attached to the washing tub 10 so that the spectacle washer may be prevented from sliding on a table or the like while allowing free vibrations of the washing tub 10 as a whole due to the vibrating actions of the mechanical vibrator 14. For power supply to the electric motor 15, there is provided one or more dry battery 18 which mounted in a battery box 19 formed in the raised bottom 10c. A starter switch 20 for starting the power supply of the battery 18 to the motor 15 is attached to the head of the nose-shaped bulge 10a of the washing tub 10. In the embodiment, moreover, a lid 21 acting as a fancy plate is adhered to the vabrator case 10d above the electric motor 15 so as to improve the decorating effects.

Figure 3:
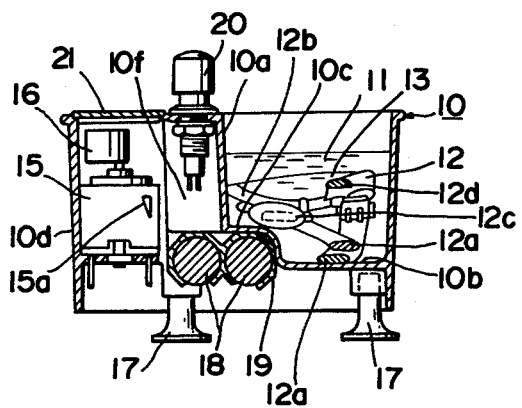
FIG. 3 is a sectional view taken along the plane 3—3 of FIG. 1.
Figure 4:
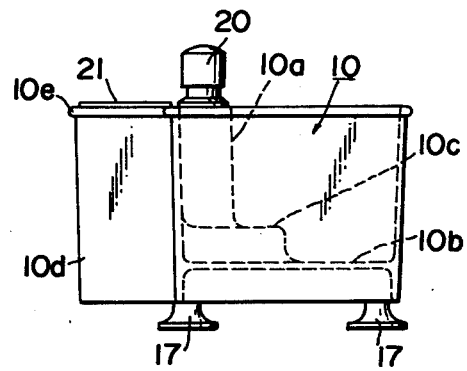
FIG. 4 is a side elevation showing the spectacle washer shown in FIGS. 1, 2 and 3.

When the spectacle washer according to the present invention is loaded with the spectacles, their frame 12 is put into the washing tub 10 with its sides 12a being folded such that the spectacle lenses 13 are directed substantially horizontally, as better seen from FIGS. 1 and 3. Thanks to the existence of the nose-shaped bulge 10a, the spectacles frame 12 never fails to be arranged without having its bowlines, if any, or the lower portions of its rims 12b and its paired nose pads 12c positioned close to that bulge 10a. In this instance, the raised bottom 10c is shaped and sized to allow the bowlines of the rims 12b and the nose pads 12c to stably rest thereon while one of the sides 12a being placed on that portion of the bottom wall 10b which is left unraised. Incidentally, the bridge 12d of the rims 12b is so constructed in accordance with the profile of a human face that it never abuts against the nose-shaped bulge 10a.

When, in operation, the washing liquid 11 is poured into the washing tub 10 to a level sufficient to soak the upper surfaces of the spectacle lenses 13 and the starter switch 20 is turned on, then the vibrator 14 starts its horizontal vibrations so that the washing tub 10 and the washing liquid 11 therein are vibrated relative to the frame 12 and the lenses 13 of the spectacles. As a result, the spectacles can be washed especially at their lenses 13 with the washing liquid 11 by the actions of the shearing forces which are established between the surfaces of the lenses 13 and the washing liquid 11.

As has been described hereinbefore, no one can fail to place the frame of spectacles in the spectacle washer of the present invention in the manner illustrated in FIGS. 1 and 3. As a result, the surfaces of the spectacle lenses including a coating or multi-layered coatings can be prevented from contacting with other than the washing water containing a detergent. Moreover, the relative motions between the washing water and the lens surfaces can be so optimized that the latter can be cleaned to an extent similar to that obtainable by an ultrasonic washing machine and with the same cleaning effects upon the lenses of both sides without any deterioration in the frame material such as a tortoise shell.

On the other hand, the construction of the embodiment is so simplified in comparison with the ultrasonic washing machine that the production cost can be reduced. In accordance with the construction of the embodiment, the battery box 19 and the starter switch 20 are provided in and on the raised bottom 10c and the nose-shaped bulge 10a, respectively, both of which are absolutely required for placement of the spectacle frame 13, with the resultant effects in compactness and decoration. In accordance with the parts arrangement of the embodiment, moreover, the electric motor 15 has its ventilating hole 15a opened into the chamber 10f which is defined by the nose-shaped bulge 10a of the washing tub 10. The chamber 10f thus defined can accommodate the slackened lead wires for the electric motor 15, the slackness of which is prepared for the vibrations.

What is claimed is:

1. A spectacle washer comprising: a washing tub of a generally rectangular shape for reserving a washing liquid therein, said washing tub having one of its longer side walls bulging thereinto to form a nose-shaped bulge extending along the vertical center line of said one of its longer side walls, said washing tub having its bottom wall partially raised to form a raised bottom extending around said vertical center line and merging into said nose-shaped bulge, said raised bottom being shaped and sized to allow at least one pair of the lower portions of the paired rims and the paired nose pads of a pair of spectacles to stably rest thereon, while one of the sides of said spectacles being placed on the remaining lower bottom wall, when said spectacle washer is located with said spectacles; and a mechanical vibrator including an electric motor mounted on said spectacle washer such that its vertical shaft of rotation is positioned in the vertical center plane, in which said vertical center line extends, and an eccentric weight having its eccentric shaft of rotation connected to the vertical shaft of said electric motor for horizontally vibrating said spectacle washer as a whole and accordingly said spectacles relative to said washing liquid, when it is turned by said electric motor, so that said spectacles may be washed with said washing liquid by the actions of the shearing forces established inbetween.

2. A spectacle washer according to claim 1, further comprising leg means supporting said spectacle washer on a table such that the former is prevented from sliding on the latter while ensuring free vibrations.

3. A spectacle washer accoridng to claim 2, wherein said leg means includes four legs made of an elastic material and attached to said washing tub.

4. A spectacle washer according to claim 1, further comprising: an electric power source for energizing the electric motor of said mechanical vibrator; a power source box formed in the raised bottom of said washing tub for accommodating said power source; and a starter switch attached to the head of the nose-shaped bulge of said washing tub for effecting the electric connection between said electric power source and said electric motor so as to start the power supply from the former to the latter.

5. A spectacle washer according to claim 1, wherein the electric motor of said mechanical vibrator has its ventilating hole opened into a chamber, which is defined by the nose-shaped bulge of said washing tub, for accommodating the slackened lead wires for said electric motor.

* * * * *